Oct. 10, 1950 M. STEINSCHLAEGER 2,524,849
PROCESS FOR THE MANUFACTURE OF
INDUSTRIAL AND POWER GASES

Filed June 10, 1944 8 Sheets-Sheet 3

Oct. 10, 1950

M. STEINSCHLAEGER

2,524,849

PROCESS FOR THE MANUFACTURE OF
INDUSTRIAL AND POWER GASES

Filed June 10, 1944

Inventor,
Michael Steinschlaeger
By Young, Emery & Thompson
attys.

Fig. 13.

Patented Oct. 10, 1950

2,524,849

UNITED STATES PATENT OFFICE 2,524,849

PROCESS FOR THE MANUFACTURE OF INDUSTRIAL AND POWER GASES

Michael Steinschlaeger, London, England

Application June 10, 1944, Serial No. 539,686
In Great Britain July 28, 1943

3 Claims. (Cl. 48—207)

This invention relates to the manufacture of water gas and other industrial and power gases.

The invention is concerned with a process of gas-making which is advantageously carried out with improved arrangements of apparatus comprising or consisting of a generator provided with a grate, preferably an automatically operated grate.

The term "generator" as used herein includes a producer.

When using a generator provided with an automatically operated grate difficulties sometimes arise owing to the grate being subjected to too high temperatures which render it necessary to renew the grate at fairly frequent intervals. Attempts have been made to overcome this difficulty by providing a jacket boiler around the generator but this has the disadvantage of increasing the fuel consumption.

It is an object of the present invention to overcome this disadvantage.

It is a further object of the invention to provide an improved intermittent gas-making process carried out in a generator of the grate type without resort to a jacket boiler or similar means for withdrawing heat from the vicinity of the grate and in which the thermal efficiency of the process is improved by recovery and re-use in the process of a large part of the heat that would otherwise be carried out of the generator in the ash or in the cooling water when a similar jacket boiler or similar means has heretofore been employed.

It is a still further object of the invention to provide an improved apparatus including a generator with or without a regenerator suitable for use in the manufacture of all kinds of industrial and power gases, for example blue water gas, carburetted water gas and synthesis gases or gases containing hydrocarbons such as benzene, toluene, butadiene or other olefines, in a satisfactory and economical manner.

With these objects in view the present invention provides a process for the manufacture of water gas and other industrial and power gases employing a generator provided with a grate, preferably an automatically operated grate, one or more conduits disposed above the grate and in the lower half of the generator for the introduction or removal of fluids, one or more conduits disposed below the grate for the admission or removal of gases or vapours used for the reactions and one or more conduits in the upper part of the generator and at least 55% of the height of the generator above the bottom thereof, for the introduction or removal of fluids.

The present invention also provides an apparatus for the manufacture of industrial and power gases which comprises a generator provided with a grate, preferably an automatically operated grate; a reaction zone of incandescent fuel, one or more conduits disposed above the grate and below the bottom of the reaction zone, for introduction and removal of fluids, one or more conduits disposed below the grate, for the admission or removal of gases or vapours used for the reactions, and one or more conduits at or above the top of the reaction zone for the introduction or removal of fluids.

Furthermore, the apparatus preferably includes a regenerator which is connected to the generator, for example by a conduit joining a point at or near the top or the bottom of the generator and a point at or near the top or the bottom of the regenerator.

It will be understood that the apparatus according to the invention will include means for introducing fuel into the generator and removal of ash and valves necessary for controlling the flow of fluids through the generator and regenerator and may also include conduits additional to those mentioned above.

A few embodiments of the invention will now be described by way of example with reference to the accompanying diagrammatic drawings, in which like parts are indicated by like reference characters, and in which.

Figure 1:
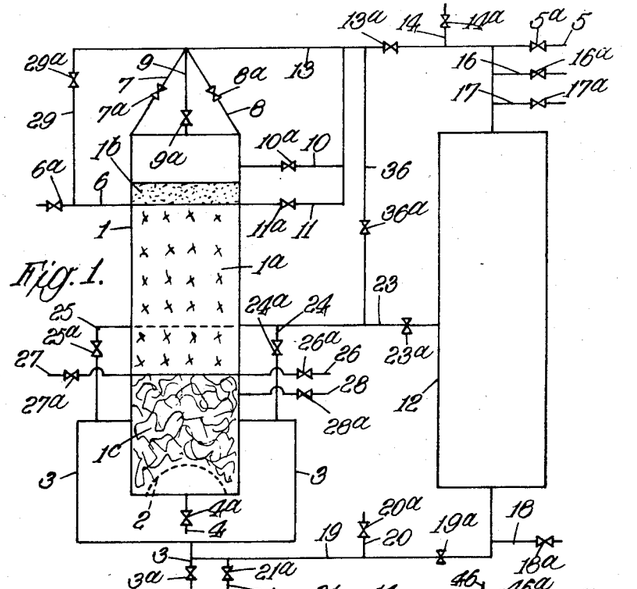
Fig. 1 is a diagrammatic drawing of an apparatus according to the invention suitable for the manufacture of blue water gas.

Referring to Fig. 1 of the drawings, the generator 1 has an automatically operated grate 2. The reaction zone is indicated by the numeral 1a, the portion of the fuel bed above the reaction zone by the numeral 1b and the ash bed by the numeral 1c.

The generator is provided with conduits 3, 4, 5, 6, 7, 8, 9, 10 and 11, controlled respectively by valves 3a, 4a, 5a, 6a, 7a, 8a, 9a, 10a and 11a. The generator is joined to the regenerator 12 by the conduit 13 controlled by valve 13a and the conduit 13 has connected to it conduits 14, 5, 16, 17, and 29 controlled respectively by valves 14a, 5a, 16a, 17a and 29a. At the bottom, the regenerator 12 is provided with a conduit 18 controlled by valve 18a and connected to a further conduit 19 controlled by valve 19a. The conduit 19 has an outlet conduit 20 controlled by valve 20a and an inlet conduit 21 controlled by valve 21a. Finally, the regenerator 12 is provided in the side thereof with another conduit 23 controlled by a valve 23a having branches 24, 25 and 36 controlled respectively by valves 24a, 25a and 36a and additional conduits 26, 27 and 28 controlled respectively by valves 26a, 27a and 28a are provided in the side of the generator.

Solid fuel such as coke is introduced into the generator 1 and the plant is operated as follows:

*Blow cycle.*—The whole or the major part of the air or other oxygen-containing gas employed is introduced through the conduit 4 and is pre-heated by the heat stored in the ash bed 1c above the grate 2 resulting from a previous operation. In the reaction zone a part of the fuel is burnt and a part of the heat of the blow gases formed remains in the reaction zone 1a. The blow gases leave the reaction zone at the average temperature thereof and may be used alone or with the addition of secondary air supplied through conduit 6 to pre-heat the fuel 1b above the reaction zone and then leave the generator at a pre-determined temperature via conduit 9. The blow gases alone or in admixture with additional fuel admitted through conduit 16 and if necessary with additional air or other oxygen-containing gas admitted through conduit 17 are used for heating the regenerator 12, and the gases leaving the regenerator by conduit 18 are used for generating steam required for the process or for other purposes.

*Gas making cycles*

(a) *Down gas making cycle.*—Steam and/or carbon dioxide alone or in admixture with other gases (according to the properties desired in the gas to be produced) are introduced into the bottom of the regenerator 12 by conduit 18 or by a separate conduit (not shown) and are heated therein to a pre-determined temperature. The gases leave the regenerator 12 by conduit 13 and either alone or in admixture with steam and/or water and/or carbon dioxide admitted through conduit 14 are introduced into the generator 1 through one or more of the conduits 6 (via 29), 7, 8, 9, 10 and 11. The gases then pass through the reaction zone 1a. After leaving the reaction zone a part of the gases produced together with undecomposed steam and/or carbon dioxide may be removed via conduits 26 and 27, or a part of the heat of the gases produced may be stored in the ash bed 1c above the grate 2 and the gases removed via conduits 3, or only a part may be removed via conduits 3, the remainder being removed via conduit 4. If a part of the gases is removed via conduit 4 it may be cooled if required before reaching the grate by the injection of water or steam or other gases or oil by conduit 28. The sensible heat of the gases leaving the generator may be used for the generation of steam. If desired part of the gases leaving the generator may be re-cycled via conduit 19 to the regenerator, the remainder being removed via conduit 20. Additional water and/or steam may be admitted if desired through conduit 21.

(b) *Up gas making cycle.*—Steam and/or carbon dioxide is introduced into the generator 1 through the conduit 4 and is superheated or pre-heated by the heat stored in the ash bed 1c above the grate 2. The steam and/or carbon dioxide then passes through the reaction zone 1a and the products are removed through one or more of the conduits 7, 8, 9, 10 and 11 according to the properties required in the gas to be produced and the nature of the fuel used. The gases leaving the generator via the conduit 13 are removed via conduit 5.

Figure 2:
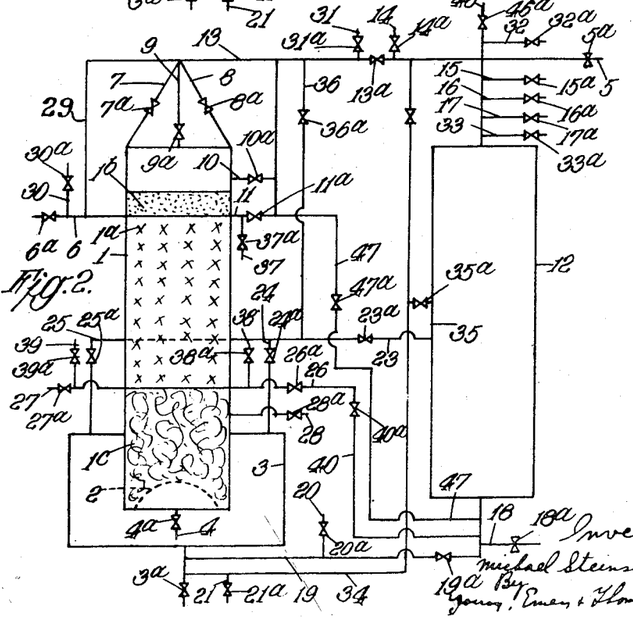
Fig. 2 is a similar drawing of an apparatus suitable for the manufacture of carburetted water gas.

Referring now to Fig. 2 of the drawings, the apparatus is similar to that shown in Fig. 1 but in addition is provided with conduits 15, 30, 31, 32, 33, 34, 35, 37, 38, 39, 40, 46 and 47 controlled respectively by valves 15a, 30a, 31a, 32a, 33a, 34a, 35a, 37a, 38a, 39a, 40a, 46a and 47a.

Solid fuel such as coke is introduced into the generator 1 and the plant is operated as follows:

*Blow cycle.*—This is carried out as described above with reference to Fig. 1 of the drawings except that water and steam may be introduced into the blow gases through conduit 33 before they enter the regenerator and oil or tar may be introduced into the blow gases leaving the regenerator 12 through conduit 18.

*Gas making cycles*

(a) *Down gas making cycle.*—Steam and/or carbon dioxide with or without one or more of the substances oil, tar or hydrocarbon gases (all of which will hereinafter be referred to as "oil") (according to the properties desired in the gas to be produced) is introduced into the bottom of the regenerator 12 by the conduit 18 or by a separate conduit (not shown) and is heated therein to a pre-determined temperature. The gases leave the regenerator by the conduit 13. Steam and/or water may be admitted by the conduit 14. Part of the gas leaving the regenerator may be allowed to leave the system by the conduit 46, oil being introduced if desired through conduit 32, and can be used for heating purposes or subjected to further treatment. The gases in the conduit 13 are then introduced into the generator 1 via one or more of the conduits 6 (via conduit 29), 7, 8, 9, 10 and 11. Part of the gas from the conduit 13 may, however, be sent via conduit 34 to be mixed with the gases leaving the generator via the conduits 3 as hereinafter described. Oil with or without water or steam is injected by conduit 35. The gases which enter the generator pass through the reaction zone 1a. After leaving the reaction zone a part of the gases produced together with undecomposed steam may be removed via conduits 26 and 27, and further oil and/or steam or water may be injected via conduits 38 and 39, or a part of the heat of the gases produced may be stored in the ash bed 1c above the grate 2 and the gases removed via conduits 3 or only a part may be removed via conduits 3, the remainder being removed via conduit 4. If water is added via conduit 38 the gases in the conduit 26 may be sent to the regenerator for further heating via the conduit 40. If a part of the gases is removed via conduit 4 it may be cooled if required before reaching the grate by injection of water or steam or other gases by a conduit 28 controlled by a valve 28a. The sensible heat of the gases leaving the generator may be used for the generation of steam. If desired part of the gases leaving the generator may be re-cycled via conduit 19 to the regenerator, the remainder being removed via conduit 20. Additional water and/or steam may be admitted if desired through conduit 21.

(b) *Up gas making cycle.*—Steam is introduced into the generator 1 through the conduit 4 and is superheated by the heat stored in the ash bed 1c above the grate 2. The steam then passes through the reaction zone 1a and the products are removed through one or more of the conduits 6 (via 29), 7, 8, 9 and 11. The gases leaving via conduits 7, 8, and 9 pass through conduit 13 and if desired may leave the system via conduit 5. Additional oil may be injected through one or more of the conduits 30, 31 and 37. Furthermore, steam or water may also be introduced through conduit 37 and it will be seen that the gases passing through conduit 11 reach the regenerator at the bottom thereof via conduit 47. During their passage up the regenerator they are further heated and further oil may be injected through one or more of the conduits 15, 32 and 33. Instead of removing gases through conduit 46 they may be fed through conduits 13 and 29 and removed via conduit 6 in which they may be mixed with gases leaving generator via conduit 6.

Figure 3:
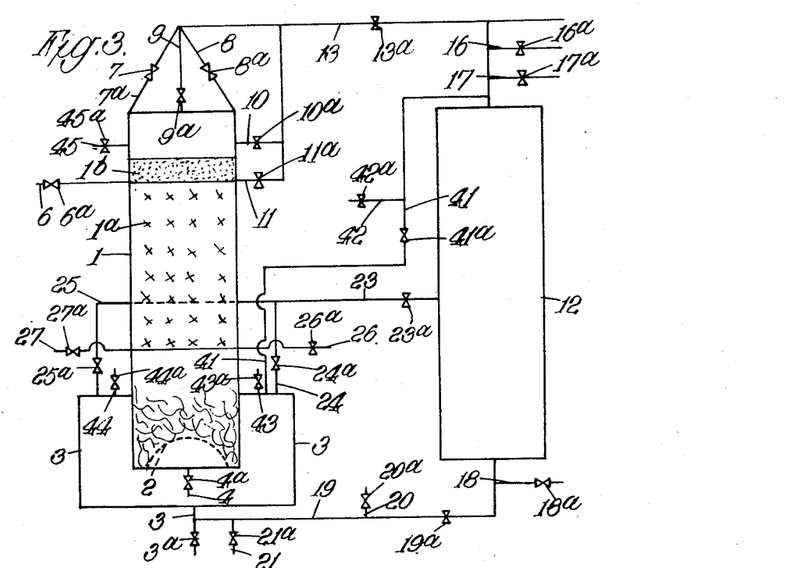
Fig. 3 is a similar drawing of an apparatus suitable for the manufacture of synthesis gas.

Referring now to Fig. 3 of the drawings, the apparatus is similar to that shown in Fig. 1 but in addition it is provided with conduits 41, 42, 43, 44 and 45 controlled respectively by valves 41a, 42a, 43a, 44a and 45a.

Solid fuel such as coke is introduced into the generator 1 and the plant is operated as follows:

*Blow cycle.*—This is carried out as described above with reference to Fig. 1 of the drawings except that additional air may be introduced via conduits 43 and 44 and a part or the whole of the blow gases may be removed through one or more of the conduits 6, 10, 11 and 45.

Gas making cycles (a) *Down gas making cycle.*—Steam and/or carbon dioxide and/or hydrocarbons alone or in admixture with other gases (according to the properties desired in the gas to be produced) are introduced into the bottom of the regenerator 12 by the conduit 18 or by a separate conduit (not shown) and are heated therein to a pre-determined temperature. The gases leave the regenerator 12 by the conduit 13 and are introduced into the generator 1 through one or more of the conduits 7, 8, 9, 10 and 11. The gas is then passed through the reaction zone 1a. After leaving the reaction zone the whole or a part of the gases may be removed through the conduits 26 and 27 or a part of the heat of the gases may be stored in the ash bed 1c above the grate 2 and the gases removed via the conduit 4. If desired part of the gases leaving the generator may be re-cycled via conduit 19 to the regenerator 12, the remainder being removed via conduit 20. Additional water and/or steam may be admitted if desired through conduit 21.

(b) *Up gas making cycle.*—Steam and/or carbon dioxide and/or hydrocarbons alone or in admixture with other gases (according to the properties desired in the gas to be produced) are introduced into the bottom of the regenerator 12 by the conduit 18. The gases leave the regenerator 12 by conduit 41, additional water and/or steam and/or carbon dioxide being introduced if desired through conduit 42. The gas is then passed through the conduits 3 into the generator 1 passing through the reaction zone 1a and leaving via the conduits 7, 8, 9 and 13. Alternatively a part or the whole of the gases may leave the system without passing through the generator.

The depth of the reaction zone 1a may be regulated by controlling the pre-heat temperature of the air, the velocity of the blow gases, and by introducing and removing the air and the gases produced and the blow gases at varying points of the generator.

If oil gas is to be produced it is advantageous to generate producer gas in the generator instead of blue water gas. A part or the whole of the producer gas may be burnt by means of air or other oxygen-containing gases and the sensible heat of the product may be used directly or indirectly (i. e. using a regenerator and using the regenerator alternately for heating gases or vapours and using the sensible heat of these gases leaving the regenerator for cracking) to crack oil or hydrocarbon gases. Similarly a part or the whole of the water gas may be burnt and used in the same manner if the apparatus is used for making water gas instead of producer gas.

More than one regenerator may be used or one regenerator may be divided into two parts interconnected by a conduit and valve, in which case both parts are heated together in one cycle and the two parts used for different purposes in the other cycle. This embodiment of the invention is described more fully hereinafter with reference to Figs. 10 and 11 of the drawings. The gases, etc., may be taken out of or brought into the regenerator at different points with predetermined temperatures, for example by using the conduits 23, 24, 25 and 3, and if desired re-cycled by means of the conduit 35.

Figure 4:
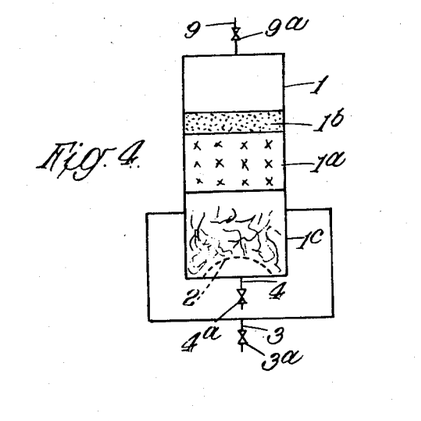
Fig. 4 is a similar drawing of a simplified apparatus consisting of a generator only for the manufacture of blue water gas.

Referring to Fig. 4 of the drawings, the generator 1 is similar to that shown in Fig. 1 of the drawings, but as will be seen from the drawing is a simplified form of apparatus.

Solid fuel such as coke is introduced into the generator and the plant is operated as follows:

There are no separate blow cycles, and gas is made alternately in the down and up directions.

(a) *Down gas making cycle.*—Oxygen together with steam and/or carbon dioxide is introduced through the conduit 9 and the blue water gas produced leaves through the conduits 3.

(b) *Up gas making cycle.*—Oxygen and/or steam and/or carbon dioxide is introduced through conduit 4, and oxygen together with steam and/or carbon dioxide is introduced through conduits 3, the blue water gas produced leaving through conduit 9. Ash is removed automatically through the automatic grate 2.

Figure 5:
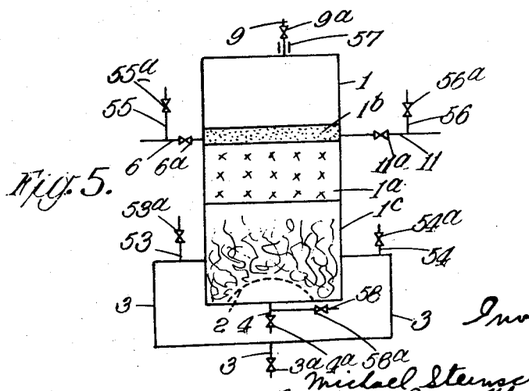
Fig. 5 is a similar drawing of a simplified apparatus consisting of a generator only for the manufacture of carburetted water gas.

Referring to Fig. 5 of the drawings, this illustrates a somewhat more complex form of the generator shown in Fig. 4 of the drawings, and is suitable for the manufacture of carburetted water gas or oil gas.

In addition to the parts shown in Fig. 4 the apparatus also comprises conduits 53, 54, 55, 56 and 58, controlled respectively by valves 53a, 54a, 55a, 56a and 58a, and heat exchanger or boiler 57.

Solid fuels such as coke is introduced into the generator 1 and the apparatus is operated as follows when manufacturing carburetted water gas.

There is no separate blow cycle and the gas making cycles are effected as follows:

(a) *Down gas making cycle.*—Oxygen together with steam and/or carbon dioxide is introduced through the conduit 9, being pre-heated in the heat exchanger 57, and the gas formed in the reaction zone 1a passes through part of the ash bed 1c, a part passing through conduits 3, oil and/or tar being injected through the conduits 53 and 54, the carburetted water gas produced leaving the apparatus through the bottom branch of the conduits 3. The remainder of the gases produced passes through the whole of the ash bed 1c and leaves via the conduit 4.

(b) *Up gas making cycle.*—Oxygen together with steam and/or carbon dioxide is introduced through the conduit 58, proceeds through the ash bed 1c, in which it is heated. A part of the gases produced in the reaction zone 1a leaves via the conduits 6 and 11, oil and/or tar being injected through the conduits 55 and 56 respectively. The remainder of the gases produced leaves through the conduit 9, giving up heat to the boiler or heat exchanger 57.

The apparatus can also be employed for the manufacture of oil gas, in which case the generator 1 is substituted by a gas producer, in which producer gas is manufactured instead of water gas, and steam or steam and air is employed instead of oxygen together with steam and/or carbon dioxide. In this case a part of the producer gas may be burnt before injecting the oil.

Figure 6:
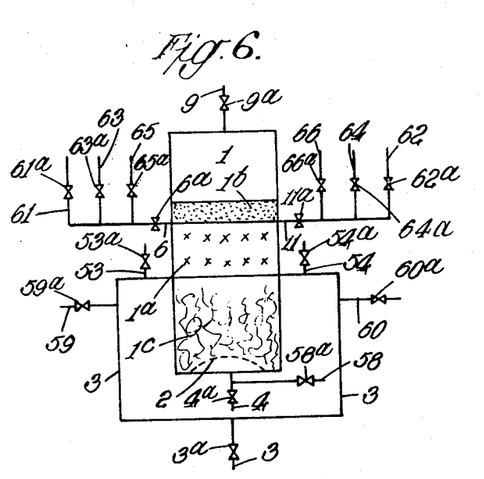
Fig. 6 is a similar drawing of a simplified apparatus consisting of a generator only for the manufacture of synthesis gas.

Referring to Fig. 6 of the drawings, this illustrates an apparatus suitable for the manufacture of synthesis gas and is a modified form of the apparatus shown in Fig. 5, in which the heat exchanger 57 is omitted and additional conduits 59, 60, 61, 62, 63, 64, 65 and 66, controlled respectively by valves 59a, 60a, 61a, 62a, 63a, 64a, 65a and 66a are provided.

Solid fuel such as coke is introduced into the generator 1 and the plant is operated as follows:

There is no separate blow period and the gas making cycles are affected as follows:

(a) *Down gas making cycle.*—Oxygen together with steam and/or carbon dioxide is introduced through the conduit 9 and a part of the gases formed in the reaction zone 1a leaves through the conduits 3, hydrocarbons or hydrocarbon-containing gases and steam and/or carbon dioxide being introduced through the conduits 53 and 54 and oxygen with or without steam and/or carbon dioxide being introduced through the conduits 59 and 60, the synthesis gas leaving through the bottom branch of the conduits 3. The remainder of the gases produced in the reaction zone 1a passes through the ash bed 1c and leaves through the conduit 4.

(b) *Up gas making cycle.*—Oxygen with or without steam and/or carbon dioxide is introduced through the conduit 58 and a part of the gases formed in the reaction zone 1a leaves through the conduits 6 and 11, hydrocarbons or hydrocarbon-containing gases being introduced through the conduits 65 and 66 and steam and/or carbon dioxide being introduced through the conduits 63 and 64, the products finally leaving through the conduits 61 and 62. The remainder of the gases produced in the reaction zone leaves through the conduit 9. Heat exchangers or boilers, or water, steam or gas injection may be used to cool the gases before they reach the valves.

Figure 7:
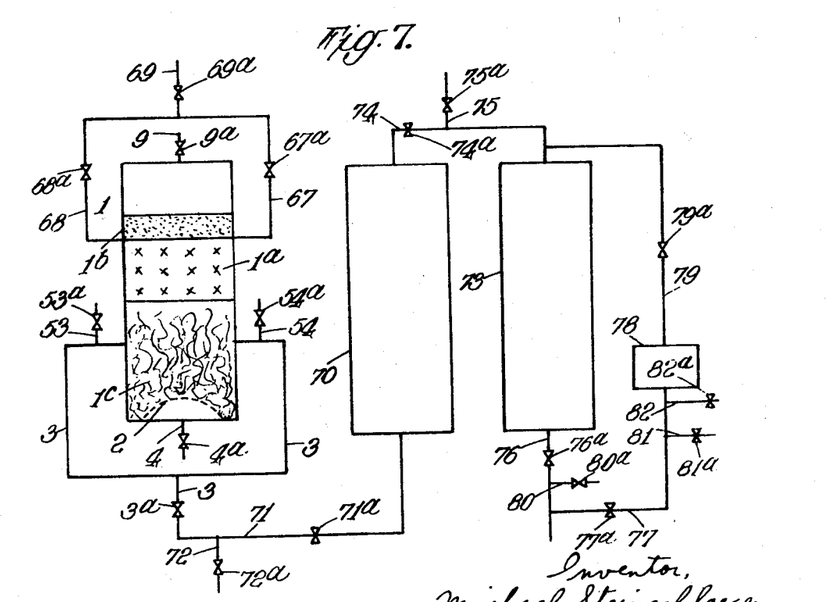
Fig. 7 is a similar drawing of an apparatus consisting of a generator and two superheaters for the manufacture of carburetted water gas.

Referring to Fig. 7 of the drawings, this illustrates an apparatus suitable for the manufacture of carburetted water gas consisting essentially of a generator and two superheaters. The generator resembles in general the generator shown in Fig. 4 of the drawings, but it has in addition conduits 53 and 54 similar to those shown in Figs. 5 and 6 of the drawings and also conduits 67, 68 and 69, controlled respectively by valves 67a, 68a and 69a.

The generator is connected to the first superheater 70 by the conduit 71 controlled by valve 71a leading from the bottom branch of the conduits 3, the conduit 71 having a conduit 72 controlled by valve 72a connected thereto. The superheater 70 is connected to the superheater 73 by the conduit 74 controlled by valve 74a, having connected thereto the conduit 75 controlled by valve 75a. An exit conduit 76 controlled by valve 76a is connected to the bottom of the superheater 73 and a re-cycling system is provided by conduit 77 controlled by valve 77a, pump 78 and conduit 79 controlled by valve 79a. In addition, further conduits 80, 81 and 82, controlled respectively by valves 80a, 81a and 82a are provided for the introduction of gases as hereinafter described.

Solid fuel such as coke is introduced into the generator 1 and the plant is operated as follows:

The steam is introduced through the conduits 69, 68 and 67 into the generator 1 and a part of the gases formed in the reaction zone 1a passes to a part of the ash bed 1c and leaves via the conduits 53 and 54. The gases leaving the bottom branch of the conduits 3 pass via the conduit 71 into the superheater 70, oil being introduced through the conduit 72. The gases leaving the superheater 70 pass through conduit 74, further oil being introduced through the conduit 75. The gases then pass into the superheater 73 and leave via conduit 76, further oil being introduced through conduit 80. If desired a part of the gases leaving the superheater 73 may be recirculated thereto via conduits 77, pump 78 and conduit 79, further oil being introduced through conduit 81. Alternatively, the pump 78 may be omitted and the circulation may be effected by steam injected through conduit 82. If a pump is employed the temperature of the gases should not be too high at the stage at which they pass through the pump.

Figure 8:
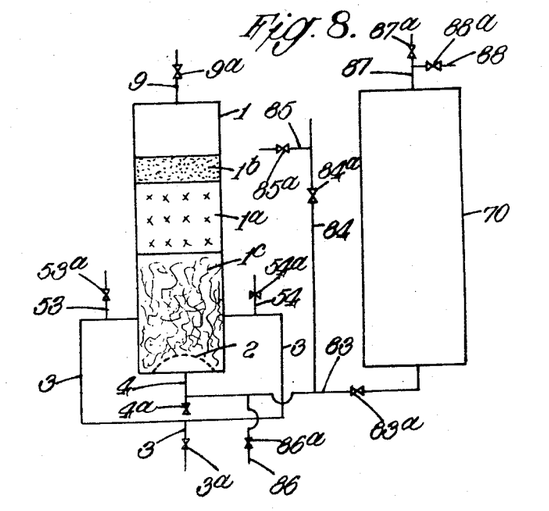
Fig. 8 is a similar drawing of an apparatus consisting of a generator and a superheater for the manufacture of carburetted water gas.

Referring to Fig. 8 of the drawings, this shows an apparatus suitable for the manufacture of carburetted water gas comprising a generator, which is similar to that shown in Fig. 4 of the drawings, together with a superheater 70 similar to that shown in Fig. 7 of the drawings. The apparatus also comprises conduits 83, 84, 85, 86, 87 and 88, controlled respectively by valves 83a, 84a, 85a, 86a, 87a and 88a.

Solid fuel such as coke is charged into the generator 1 and the plant is operated as follows:

Steam and/or carbon dioxide with or without air is introduced into the generator 1 via conduit 9 and a part of the gases produced in the reaction zone 1a passes through a part of the ash bed 1c into the conduits 3, oil being introduced through conduits 53 and 54, the carburetted water gas thus produced leaving through the bottom branch of the conduits 3. The remainder of the gases produced passes through the whole of the ash bed 1c into the conduit 4, a part leaving through this conduit and the remainder passing through conduit 83 into the superheater 70, leaving via conduit 87, air, oxygen, steam, carbon dioxide, oil or tar or a mixture of these being introduced through the conduit 86 and oil being introduced through conduit 88. A part of the gas passing through conduit 83 may be led off through conduit 84, oil being introduced through conduit 85.

Figure 9:
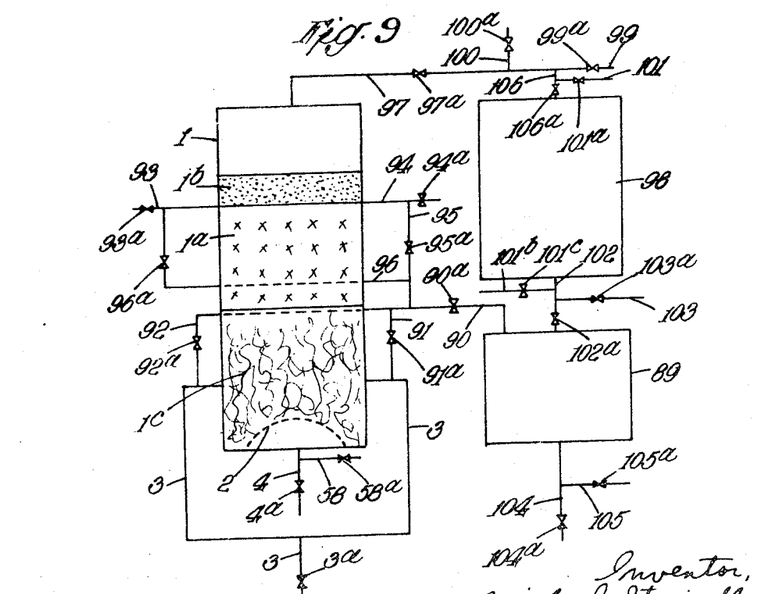
Fig. 9 is a similar drawing of an apparatus consisting of a generator and a regenerator divided into two parts for the manufacture of carburetted water gas.

Referring to Fig. 9 of the drawings, this shows an apparatus suitable for the manufacture of carburetted water gas comprising a generator and a regenerator divided into two parts. The generator is in general similar to that shown in Fig. 1 of the drawings, but with modifications in the conduits connecting the generator with the regenerator. Thus the generator 1 is connected to the lower part 89 of the regenerator by the conduit 90 controlled by valve 90a, which has branches 91 and 92 controlled respectively by valves 91a and 92a connecting the conduit 90 with the conduits 3. The generator 1 is also provided with conduits 93 and 94 controlled respectively by valves 93a and 94a, the conduit 94 being connected to the conduit 90 by the conduit 95 controlled by valve 95a, which in turn is connected by the conduit 96 controlled by valve 96a to the conduit 93. Conduits 97 controlled by valve 97a and 106 controlled by valve 106a connect the top of the generator 1 with the top part 98 of the regenerator. In addition, an exit conduit 99 controlled by valve 99a is provided and also inlet conduits 100, 101 and 101b controlled respectively by valves 100a, 101a and 101c. The upper part 98 and the lower part 89 of the regenerator are connected with a conduit 102 controlled by valve 102a, the conduit 102 being connected with the inlet conduit 103 controlled by valve 103a, whilst a further conduit 104 controlled by valve 104a is provided at the bottom of the lower part 89 of the regenerator, the said conduit 104 having a branch conduit 105 controlled by valve 105a for the purpose hereinafter specified.

Solid fuel such as coke is introduced into the generator 1 and the plant is operated as follows:

*Blow cycle.*—This is carried out by introducing air via conduits 3 and 4, thereby heating the reaction zone 1a, the blow gases leaving through conduit 97 and thence proceeding via conduit 106 through the upper part 98 of the regenerator, and thence via conduit 102 to the lower part 89 of the regenerator, the gases being removed through conduit 104. Additional air is admitted through conduit 101 in the first part of the regenerator and through 101b in the second part of the regenerator. The blow gases entering the upper part 98 of the regenerator may have a temperature of, for example, 1200° C., whilst those entering the lower part 89 of the regenerator may have a temperature of, for example, 450 to 600° C.

*Gas making cycles*

(a) *Up gas making cycle.*—Steam is admitted through conduit 58 and passes through the ash bed 1c in which it is superheated and thence passes into the reaction zone 1a. A part of the water gas produced leaves through conduits 93 and 94 and is carburetted by oil which has been admitted through conduit 105, pre-heated in the lower part 89 of the regenerator, and then admitted through conduit 90 and thence through conduits 95 and 96 into the conduits 94 and 93 respectively. The remainder of the water gas produced leaves through conduit 97 and is mixed with gas from the conduit 106, which is produced as follows: Steam is admitted through conduits 103 and 102 into the upper part 98 of the regenerator in which it is heated, and oil is admitted through conduit 101 and is cracked by the sensible heat of the steam leaving the upper part 98 of the regenerator. Mixed gases from the conduits 97 and 106 are removed via conduit 99.

(b) *Down gas making cycle.*—Steam is admitted through conduit 103 and passes via conduit 102 into the upper part 98 of the regenerator, in which it is pre-heated to a temperature of, for example, 1000° C. The pre-heated steam then passes via conduits 106 and 97 into the top of the generator 1, water gas being formed in the reaction zone 1a. A part of the water gas leaves via conduits 3 and is carburetted in the following manner: Oil is passed through conduit 104 into the lower part 89 of the regenerator and the pre-heated oil then passes through conduit 90 and is split into two streams, a part going through conduit 91 and the remainder through conduit 92. The remainder of the water gas produced leaves through conduit 4.

Figure 10:
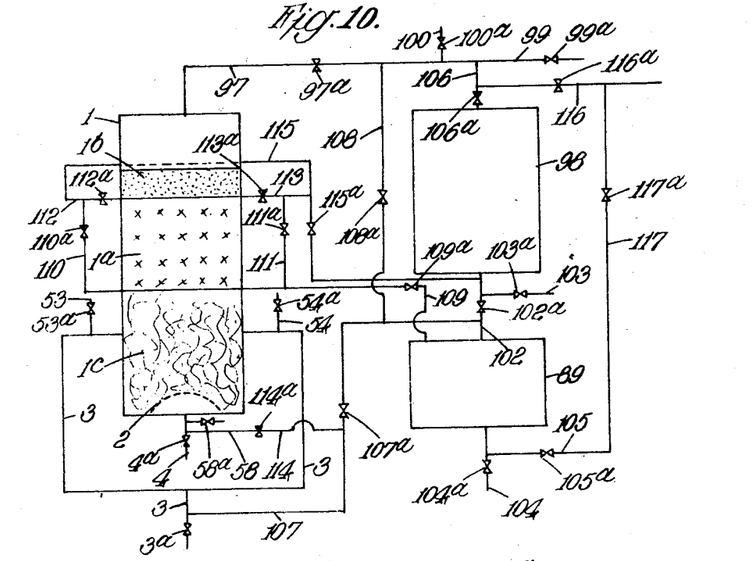
Fig. 10 is a similar drawing of a modification of the apparatus shown in Fig. 9.

Referring to Fig. 10 of the drawings, this shows a modification of the apparatus illustrated in Fig. 9 of the drawings, and is also suitable for the manufacture of carburetted water gas.

The generator and regenerator are in general similar to those shown in Fig. 9, with some conduits omitted and the following additional conduits provided: Conduits 53 and 54 controlled respectively by valves 53a and 54a, similar to those shown in Fig. 8 are provided, whilst the conduit 107 controlled by valve 107a connects the bottom branch of the conduits 3 and conduit 102. A branch conduit 114 controlled by valve 114a leads from the conduit 107 to the conduit 4. Conduits 107 and 97 are connected by conduit 108 controlled by valve 108a. A further conduit 109 controlled by valve 109a is provided in the top of the lower part of the regenerator, and has two branches, 110 and 111, controlled respectively by valves 110a and 111a, which in turn are connected respectively to conduits 112 and 113, controlled respectively by valves 112a and 113a. A manifold 115 is provided to collect the gases passing through conduits 112 and 113 and convey them to the upper part of conduit 102. Conduits 116 and 117 controlled respectively by valves 116a and 117a in the regenerator part of the system are also provided for the purpose hereinafter specified.

Solid fuel such as coke is introduced into the generator 1 and the plant is operated as follows:

*Blow cycle.*—This is carried out by admitting air through conduit 104, the air being pre-heated in the lower part 89 of the regenerator and passing via conduits 102, 107 and 114 into the conduit 4, through which it is admitted into the generator 1. Reaction takes place in the reaction zone 1a and the blow gases leave through conduit 97, additional pre-heated air being admitted through conduit 108 from conduit 107, whilst still further air is admitted through conduit 100. The blow gases then proceed via conduit 106 into the upper part 98 of the regenerator, which is thereby heated, for example to a temperature of 1000° C., the gases leaving the upper part 98 of the regenerator then proceeding through conduit 102 to the lower part 89 of the regenerator, which is thereby heated, for example to a temperature of 450° C. The blow gases then leave through conduit 104.

*Gas making cycles*

(a) *Up gas making cycle.*—Steam is admitted through conduit 58 into the generator 1 and is superheated by passage through the ash bed 1c, the reaction taking place in the reaction zone 1a. The water gas produced leaves via conduits 112 and 113, oil for carburetting being injected through conduits 110 and 111, which are supplied with pre-heated oil as follows: Oil is admitted through conduit 105 and passes through the lower part 89 of the regenerator, where it is pre-heated, and thence passes through conduit 109 to conduits 110 and 111. The water gas carburetted in conduits 112 and 113 leaves via manifold 115 and thence passes to the upper part of conduit 102, through the upper part 98 of the regenerator, and leaves through conduit 106. The remainder of the water gas leaves through conduit 97 and thence passes through the conduit 106 and the conduit 116, in which oil is injected through conduit 117. If desired, a part of the water gas produced, without being carburetted may leave through conduits 97 and 99.

(b) *Down gas making cycle.*—Steam is introduced through conduit 103 and is superheated in the upper part 98 of the regenerator, and thence passes via conduits 106 and 97 to the top of the generator 1. Reaction takes place in the reaction zone 1a and a part of the water gas produced leaves through conduits 3, oil for carburetting being introduced through conduits 53 and 54. The remainder of the water gas leaves through conduit 4. Oil introduced through conduits 53 and 54 may be pre-heated by passing it through the lower part 89 of the regenerator.

Figure 11:
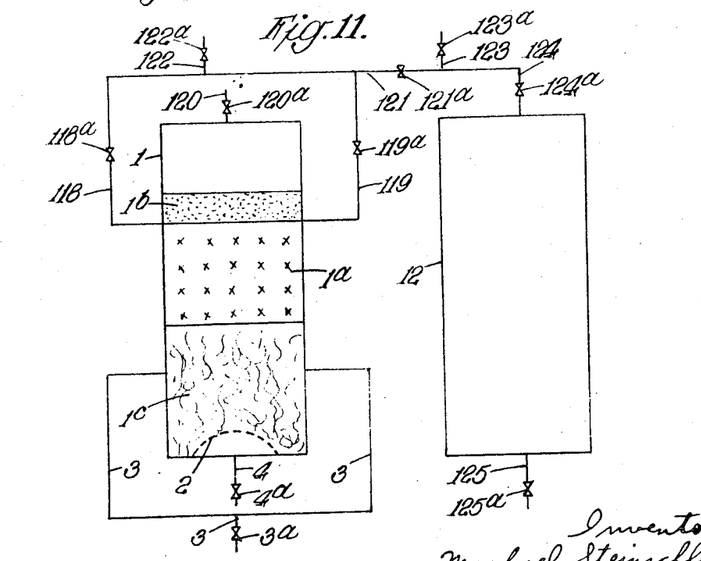
Fig. 11 is a similar drawing of an apparatus consisting of a producer and a regenerator for the manufacture of producer gas.

Referring to Fig. 11 of the drawings, this shows an apparatus comprising a generator and a regenerator suitable for the manufacture of producer gas.

The generator 1, in addition to conduits 3 and 4 as used in other figures of the drawings, is provided with conduits 118 and 119 and 130, controlled respectively by valves 118a, 119a and 120a. Conduits 118 and 119 unite in the manifold 121 controlled by valve 121a, which is provided with conduits 122 and 123, controlled respectively by valves 122a and 123a. The manifold 121 is connected to the regenerator 12 by means of conduit 124, controlled by valve 124a, and the regenerator 12 is provided at its lower end with a conduit 125, controlled by valve 125a.

Solid fuel such as coke is introduced into the generator 1 and the plant is operated as follows:

*Gas making cycles*

(a) *Down gas making cycle.*—Steam and/or air is introduced into the regenerator 12 through conduit 125 and thence proceeds through the regenerator 12 to the conduit 124, steam or water being introduced through conduit 123. The mixed gases then proceed to the manifold 121, and are introduced into the generator 1 through conduits 118 and 119. The producer gas leaves the generator partly through conduits 3 and partly through conduit 4.

(b) *Up gas making cycle.*—Steam and/or air is introduced into the generator 1 through conduit 4, proceeding through the ash bed 1c, and the producer gas obtained leaves partly through conduit 120 and partly through conduits 118 and 119, from whence it proceeds via manifold 121 and conduit 124 to the regenerator 12, which is heated thereby, the gas finally leaving through conduit 125.

Figure 12:
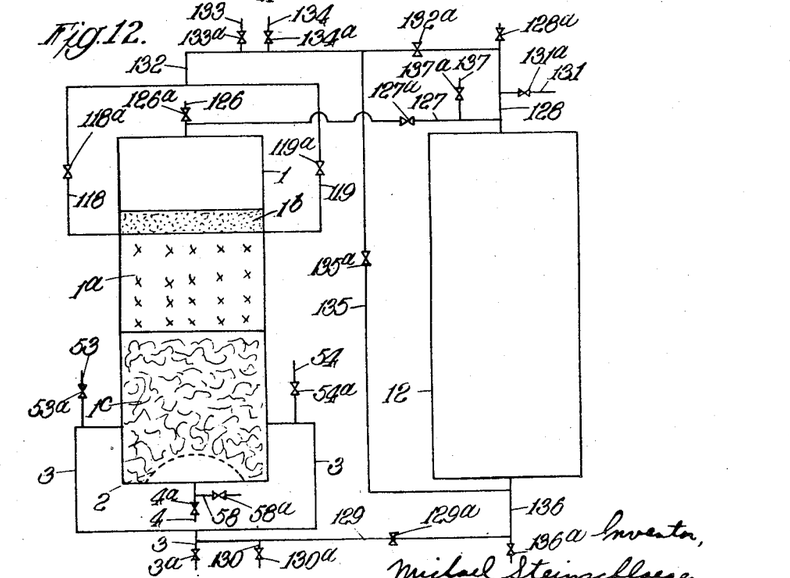
Fig. 12 is a similar drawing of an apparatus consisting of a generator and regenerator for the manufacture of carburetted water gas.

Referring to Fig. 12 of the drawings, this shows an apparatus somewhat similar to that illustrated in Fig. 11 of the drawings, and suitable for the manufacture of carburetted water gas.

The generator and regenerator are similar to those shown in Fig. 11. The generator 1 has at the top thereof a conduit 126, controlled by valve 126a, which is connected by the conduit 127, controlled by valve 127a, with the conduit 128, controlled by valve 128a at the top of the regenerator 12. A further conduit 137, controlled by valve 137a, is connected to the conduit 127 for the purpose hereinafter described. The bottom branch of the conduits 3 is also connected to the bottom of the regenerator 12 by means of a conduit 129, controlled by valve 129a, said conduit having a further conduit 130, controlled by valve 130a connected thereto. In addition, a conduit 131, controlled by valve 131a, is connected to the conduit 128, whilst conduits 118 and 119 meet at the conduit 132, controlled by valve 132a, which has connected thereto two further conduits 133 and 134, controlled respectively by valves 133a and 134a. A conduit 135, controlled by valve 135a, joins the conduit 132 to the conduit 136, controlled by valve 136a, which is connected to the bottom of the regenerator.

Solid fuel such as coke is introduced into the generator 1 and the plant is operated as follows:

*Blow cycle.*—This is carried out by admitting air through conduits 3 and 4 into the generator 1. The blow gases leave through conduit 126 and pass via conduit 127. Secondary air is introduced through conduit 137, and the gases then proceed via conduit 128 into the regenerator 12. The blow gases leave the regenerator 12 through conduit 136.

*Gas making cycles*

(a) *Down gas making cycle.*—Steam is admitted through conduit 126 into the generator 1, water gas being formed in the reaction zone 1a. Part of the water gas formed leaves via conduit 4 and the remainder leaves through conduits 3, tar and/or oil being injected through conduits 53 and 54 to carburet the water gas. The gases leaving the bottom branch of the conduits 3 proceed via the conduit 129 to conduit 136, steam and/or water being injected through conduit 130. The carburetted water gas then proceeds to the regenerator 12 in which it is further heated and additional oil is introduced through conduit 131. If desired, a part of the gases produced can be re-cycled to the generator 1 via conduits 127 and 126.

(b) *Up gas making cycle.*—Steam is introduced through conduit 58 into the generator 1 and the water gas produced in the reaction zone 1a leaves through conduits 118 and 119 and then proceeds via conduit 132, additional tar and/or oil being injected through conduit 133 and water and/or steam through conduit 134. The carburetted gas then proceeds via conduit 135 and conduit 136 to the regenerator 12 where it is further heated, and leaves via conduit 128, further oil being injected through conduit 131.

Figure 13:
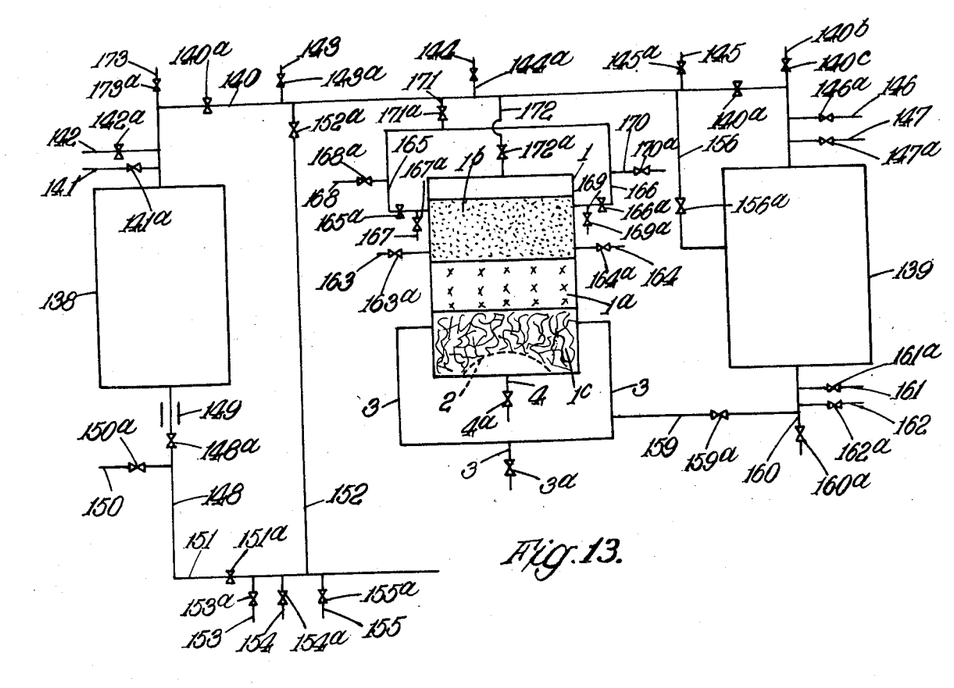
Fig. 13 is a similar drawing of an apparatus consisting of a generator and two regenerators for the manufacture of synthesis gas.

Referring to Fig. 13 of the drawings, this shows an apparatus comprising a generator and two regenerators, suitable for the manufacture of synthesis gas from coal and residual gas of the Fischer-Tropsch and similar syntheses.

In addition to the generator 1, the apparatus comprises the regenerators 138 and 139 which are connected together by the conduit 140, controlled by valves 140a and 140d, and the regenerator 139 is provided with an outlet conduit 140b controlled by valve 140c. The conduit 140 has connected to it conduits 141, 142, 143, 144, 145, 146 and 147, controlled respectively by valves 141a, 142a, 143a, 144a, 145a, 146a and 147a. The regenerator 138 has connected to the bottom thereof a conduit 148, controlled by valve 148a, passing through a heat exchanger 149 and having connected to it conduit 150, controlled by valve 150a. Conduit 148 is also connected to a conduit 151, controlled by valve 151a, which in turn is connected by the conduit 152, controlled by valve 152a, with the conduit 140. The conduit 151 also has connected thereto conduits 153, 154 and 155, controlled respectively by valves 153a, 154a and 155a. The conduit 140 is also connected to the regenerator 139 by conduit 156, controlled by valve 156a. A conduit 159, controlled by valve 159a, is also provided which joins the conduits 3 with a conduit 160, controlled by valve 160a, connected to the bottom of the regenerator 139. The conduit 160 also has connected thereto conduits 161 and 162, controlled respectively by valves 161a and 162a. The generator 1 has connected thereto conduits 163, 164, 165 and 166, controlled respectively by valves 163a, 164a, 165a and 166a. The conduit 165 has connected thereto conduits 167 and 168, controlled respectively by valves 167a and 168a, whilst the conduit 166 has connected thereto conduits 169 and 170 controlled respectively by valves 169a and 170a. The conduits 165 and 166 meet and are joined to the conduit 171, controlled by valve 171a, which is connected to the conduit 140. The generator is also provided at the top thereof with a conduit 172 controlled by valve 172a, connecting it with the conduit 140. The conduit 140 also has a branch conduit 173, controlled by valve 173a.

Coal is introduced into the generator 1 and the plant is operated as follows:

*First blow cycle.*—Air is admitted to the generator 1 through conduit 4, secondary air being admitted through conduits 163 and 164 or 167 and 169. Steam which may be super-heated or other gases may be admitted through conduits 163 and 164 and a part of the blow gases produced leaves the generator 1 through conduits 165 and 166, and reaches the conduit 140 via conduit 171, liquid or gaseous fuel being introduced through conduits 168 and 170. The remainder of the blow gases leaves the generator 1 via conduit 172 and thus also reaches the conduit 140. The gases in the conduit 140 pass into the regenerator 139, additional liquid or gaseous fuel being admitted through conduit 146 and additional air through conduit 147. The gases leave the regenerator 139 through conduit 160. Residual gas from the synthesis plant with steam is admitted into the regenerator 138 through conduit 141, the decomposed gases leaving the regenerator 138 through conduit 148 after passing through the heat exchanger 149.

*Down gas making cycle.*—Steam is admitted through conduit 161 into the regenerator 139. The steam leaves the regenerator 139 through conduit 140 and passes through conduits 171, 165 and 166 into the fuel bed 1b. A part of the steam passes into the reaction zone 1a wherein water gas is made, and the other part passes through the fuel bed 1b, carbonises the coal and leaves through conduits 170 and 168 and thence may pass either into the regenerator 138 via conduit 140 or is sent for purification via conduits 140, 152 and 151. At the same time steam, residual gas and carbonisation gas are admitted through conduit 173 into the regenerator 138. The products leave through conduit 148 and are sent to the synthesis plant via conduit 153. If desired, a part or the whole of the steam may leave the regenerator 139 through conduit 156.

Superheated steam may be admitted through conduit 144 in which case the regenerator 139 may be used for other purposes such as decomposition of residual gases or carbonisation gases admitted through conduit 162.

*Up gas making cycle.*—Steam is admitted through conduit 4 into the generator 1, a part of the gas produced leaving through conduits 165 and 166. Additional steam which may be superheated is admitted through conduits 167 and 168, the gas then proceeding through conduit 171 into conduit 140. The remainder of the gas produced in the generator leaves through conduit 172 and thence passes into conduit 140. The gas in conduit 140 is either sent to the regenerator 138 or is removed for cooling and purification via conduits 152 and 151. If desired, water and/or steam and/or carbon dioxide is admitted through conduit 143, residual gas being admitted through conduit 142 and steam being admitted through conduit 141. The gases leave the regenerator 138 through conduit 148, passing through heat exchanger 149. At the same time the regenerator 139 is heated by burning additional gaseous or liquid fuel introduced through conduit 146 by means of air introduced through conduit 147.

*Second blow cycle.*—Residual gas is admitted through conduit 161 and steam through conduit 162 into the regenerator 139. The decomposed gas leaving the regenerator 139 passes via conduit 140b to the synthesis plant.

At the same time air is admitted through conduit 4 and passes through the ash bed 1c, the reaction zone 1a, and a part leaves the generator through conduits 165 and 166, the remainder leaving through conduit 172, both parts then being sent to the regenerator 138 through conduits 140, 152, 151 and 148 after admission of fuel through conduit 154 and air through conduit 153. The gases leave the regenerator 138 via conduit 173. Steam or carbon dioxide which may be superheated may be admitted through conduits 163 and 164.

Figure 14:
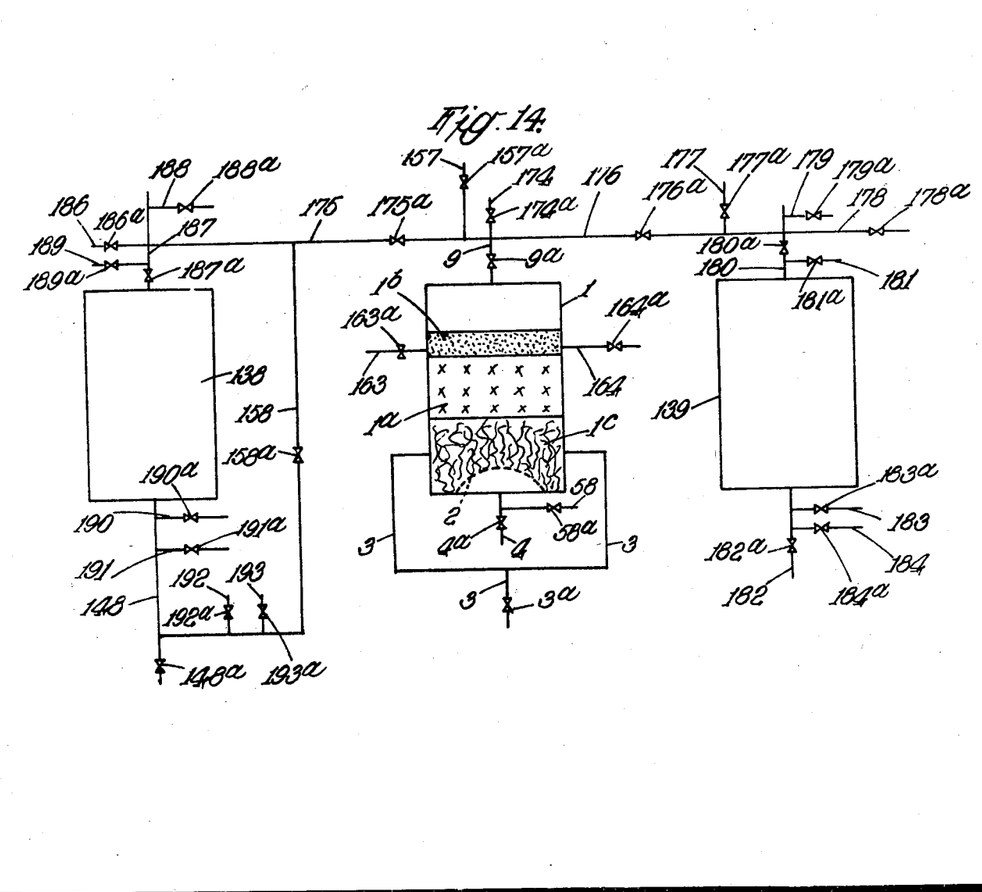
Fig. 14 is a similar drawing of an apparatus consisting of a generator and two regenerators, also for the manufacture of synthesis gas.

Referring to Fig. 14 of the drawings, this shows an apparatus consisting of a generator and two regenerators, which may be regarded as a simplified form of the apparatus shown in Fig. 13, and can also be used for the manufacture of synthesis gas.

The generator 1 has conduits which are referred to in previous figures of the drawings, and is connected to the regenerator 138 by the conduits 175 and 187, controlled respectively by valves 175a and 187a, and to the regenerator 139 by the conduits 176 and 180, controlled respectively by valves 176a and 180a. The conduit 175 continues as conduit 186, controlled by valve 186a, and the conduit 187 has connected to it two further conduits 188 and 189, controlled respectively by valves 188a and 189a. Likewise, the conduit 180 has connected to it conduits 179 and 181, controlled respectively by valves 179a and 181a, whilst the conduit 176 has connected to it the conduit 177, controlled by valve 177a. The conduit 158, controlled by valve 158a, connects the conduits 175 and 148. The conduit 158 has connected thereto conduits 192 and 193, controlled respectively by valves 192a and 193a. The conduit 9 is continued as the conduit 174, controlled by valve 174a, and the conduit 175 has connected to it the conduit 157 controlled by valve 157a. At the bottom of the regenerator 138 there is connected the conduit 148, controlled by valve 148a, to which is connected the conduit 190, controlled by valve 190a, and the conduit 191, controlled by valve 191a. Likewise, the conduit 182, controlled by valve 182a, is connected to the bottom of the regenerator 139 and has connected to it the conduit 183, controlled by valve 183a, and the conduit 184, controlled by valve 184a.

Solid fuel such as coke is introduced into the generator 1 and the plant is operated as follows:

*First blow cycle.*—Air, which may be pre-heated, is introduced through conduit 4 into the generator 1, and secondary air is introduced through conduits 163 and 164. The blow gases leave the generator 1 by the conduit 9 and proceed through conduits 175 and 180 into the regenerator 139, additional fuel being introduced through conduit 178 and additional air through conduit 181. The blow gases leave the regenerator 139 by the conduit 182. Steam and/or carbon dioxide is admitted through conduit 190 and residual gas and/or other hydrocarbon-containing fuel is admitted through conduit 191, the mixture proceeding through conduit 148 into the regenerator 138, the gases leaving by the conduit 187. The gases are then removed through conduit 186.

*Down gas making cycle.*—Steam and/or carbon dioxide, with or without residual gas, is admitted through conduits 183 and 184 into the regenerator 139, and the gases leave through conduit 180. Further steam and/or carbon dioxide is admitted through conduit 178 and water and/or steam and/or carbon dioxide through conduit 177, whilst superheated steam or preheated carbon dioxide is admitted through conduit 174, and the gas mixture then proceeds via conduit 9 into the top of the generator 1, a part of the gases produced leaving through conduit 4 and the remainder leaving through conduits 3. Steam and/or carbon dioxide is also admitted through conduit 190 and residual gas through conduit 191 into the regenerator 138, and the gases produced leave through conduit 186.

*Up gas making cycle.*—Steam is admitted through conduit 58 into the generator 1 and the water gas produced is removed through conduits 9 and 157. Fuel is admitted through conduit 178 and air through conduit 181, the gases leaving the regenerator 139 through conduit 182. Steam and/or carbon dioxide is also admitted through conduit 186 and residual gas through conduit 189 into the regenerator 138, the gases leaving the regenerator 138 through conduit 148.

*Second blow cycle.*—Air is admitted through conduit 4 into the generator 1, secondary air being admitted through conduits 163 and 164. The blow gases leave through conduit 9 and are sent through conduits 175 and 158 to the regenerator 138, air being admitted through conduit 193 and additional fuel through conduit 192. The gases leave the regenerator 138 through conduit 187. Steam and/or carbon dioxide is also admitted through conduit 183 and residual gas through conduit 184 into the regenerator 139, the gases produced leaving through conduit 178.

Some examples of the use of the apparatus according to the invention will now be given.

1. *Manufacture of blue water gas*

The apparatus shown in Fig. 1 of the drawings was used blowing periods being employed.

The fuel used was coke, which had an average analysis of C=96.7%, $H_2$=0.4%, $O_2$=0.4%, S=1.2% and $N_2$=1.3% (calculated on a dry ash-free basis) and its calorific value calculated on the same basis was 8000 Cals. The gas production per gas making period was 500 cubic metres (calculated on a dry basis at 0° C. and 760 mms. pressure); the average temperature in the reaction zone was 1100° C. and the average temperature of the gases and undecomposed steam leaving the reaction zone was also 1100° C. The composition of the blue water gas produced was CO=42.8%, $CO_2$=4.0%, $H_2$=49.3%, $CH_4$=0.4% and $N_2$=3.5%. The composition of the blow gases leaving the generator was $CO_2$=16.0%, CO=8.0%, and $N_2$=76.0%, and the air required per cubic metre of blow gas was 0.96 cubic metre.

The heat (R) required for the chemical reaction (taking into account the composition of the gas generated and the composition of the fuel used) in the production of the blue water gas as described above is 490 Cals. per cubic metre of blue water gas produced, and is calculated from the following formula:

$$R = r_{CO}CO + r_{CO_2}CO_2 - 2570[(CO + 2_{CO_2})] - \left(2\frac{N_G - N_C}{5.78} + 2CH_4\right)$$

$r_{CO}$=heat of formation of carbon monoxide in Cals.

$r_{CO_2}$=heat of formation of carbon dioxide in Cals.

CO, $CO_2$ and $CH_4$=the concentrations of carbon monoxide, carbon dioxide and methane in the gas, respectively.

$N_G$=concentration of nitrogen in the gas.

$N_C$=concentration of nitrogen in the fuel.

Let the amount of carbon required to be directly converted into blue water gas per cubic metre of blue water gas produced be denoted by Cg; then Cg=0.536 (CO+$CO_2$+$CH_4$)=0.536 (0.428+0.040+0.0040)=0.253 kgms. of carbon.

Let the amount of carbon required for the generation of 1 cubic metre of blow gas be denoted by Cc; then Cc=0.536 (CO+$CO_2$)=0.536 (0.08+0.16)=0.131 kgm.

300 cubic metres of gas were made in the down gas making cycle using 151 kgms. of steam and 200 cubic metres were made in the up gas making cycle using 101 kgms. of steam. Blowing up effected in the up direction.

*Down gas making cycle.*—The sensible heat of the gases produced and undecomposed steam leaving the reaction zone 1a was 126,000 Cals. The sensible heat of the gases leaving through the conduits 3 was 16,300 Cals. and the sensible heat of the gases leaving through conduit 4 was 10,700 Cals., making a total of 27,000 Cals. so that the heat stored in the ash bed 1c was 99,000 Cals. per cycle.

The heat taken out of the fuel bed 1b assuming that the steam reaches the reaction zone 1a at a temperature of 1050° C. is 151×1050× 0.513 − 151 × 120 > 0.447 = 81,000 − 8,000 = 73,000 Cals.

*Up gas making cycle.*—The sensible heat of the gases leaving the reaction zone $1a$ is 84,000 Cals.

The sensible heat of the gases leaving the generator $1$ is 29,000 Cals. so that the heat stored in the fuel bed $1b$ is 55,000 Cals.

The heat removed from the ash bed $1c$ by the steam, assuming that the steam enters the reaction zone $1a$ at 1050° C. is $101 \times 1050 \times 0.513 - 101 \times 120 \times 0.447 = 54,400 - 5,400 = 49,000$ Cals. The sensible heat of the gases and undecomposed steam leaving the reaction zone $1a$ is $126,000 + 84,000 = 210.000$ Cals. per cycle. The heat required for the reaction is $500 \times 490 = 245,000$ Cals.

The heat required for the production of 500 cubic metres of blue water gas, without taking into account the heat introduced by the coke and steam into the reaction zone is $210,000 + 245,000 = 455,000$ Cals. per cycle. The heat brought into the reaction zone by the coke (assuming that the coke contains 87.0% of carbon and that the amount of coke used in the gas making cycle is 0.290 kgm. per cubic metre and 0.155 kgm. per cubic metre in the blow cycle), the coke entering the reaction zone at 1090° C., is: Gas making cycle, $0.290 \times 500 \times 1090 \times 0.377 = 60,000$ Cals. Blow cycle, $0.155 \times 500 \times 1090 \times 0.377 = 32,000$ Cals.

The heat brought into the reaction zone by the steam is $81,000 + 54,000 = 135,000$ Cals., so that the total heat brought into the reaction zone by the steam and the coke in the gas making cycle is 195,000 Cals. The heat to be stored by the blow gases in the reaction zone per cycle is $455,000 - 195,000 = 260,000$ Cals.

The amount of blow gases required to store 260,000 Cals. per cycle is calculated as follows: The temperature of the blow gases leaving the reaction zone is 1100° C. and the heat introduced by 1 cubic metre of blow gases is $0.16 \times 4364 + 0.08 \times 1344 = 807$, to which must be added the heat which is generated from the hydrogen and sulphur present in the coke, which amounts to 19 Cals. (after deducting the heat in the gases leaving the reaction zone), so that the total heat generated by 1 cubic metre of blow gases is 826 Cals. As the gases leave the reaction zone at 1100° C. the heat stored in the reaction zone per cubic metre of blow gases obtained from 0.96 cubic metre of air and 0.151 kgm. of coke is $826 - 1100 \times 0.360 = 420$ Cals. per cubic metre of blow gases. The total heat to be introduced with the blow gases, taking into account the heat introduced with the coke in the blow cycle and the heat introduced with the air is $260,000 - (32,000 + 48,000) = 180,000$ Cals. Therefore the amount of blow gases required per cycle is 430 cubic metres and the amount of air required 412 cubic metres per cycle.

The carbon required in the blow cycle to generate 1 cubic metre of blue water gas is $$430 \times \frac{0.131}{500} = 0.112 \text{ kgm.}$$

of carbon.

The total carbon consumption per cubic metre of blue water gas produced, assuming the losses to be 7.0%, is 0.3805 kgm. of carbon per cubic metre, measured at 0° C. and 760 mms. pressure.

The thermal efficiency of the apparatus is $$\frac{2,838}{0.3805 \times 8,000} = 93.0\%$$

The output or capacity of the apparatus is very high, as only 520 Cals. require to be stored per cubic metre of gas to be manufactured. The velocities of the gases are high and the temperature drop in the reaction zone is not very rapid.

In the above calculations, the sensible heat of the air entering the generator at a temperature of 20° C. and the sensible heat of the ash leaving the generator at a temperature of 150° C. has been ignored.

The heat stored in the apparatus at various parts is as follows: In the down gas making cycle, the steam removed from the fuel 73,000 Cals. and 99,000 Cals. is stored in the ash bed, whilst in the up gas making cycle 49,000 Cals. is removed from the ash bed by the steam and 55,000 Cals. is stored in the fuel bed. In the blow cycle, 48,000 Cals. is removed from the ash bed by the air, whilst 110,000 Cals. is stored in the fuel bed.

Assuming that the cross-sectional area of the generator is 10 square metres and that the fuel bed outside the reaction zone is equivalent to a height of 1 metre, the amount of coke in this part of the bed will be 6,000 kgms., and to store, as in this case, 165,000 Cals. an increase of temperature of 75° C. is required.

In the ash bed, to store 99,000 Cals., assuming the same volume and the weight of the ash to be 900 kgms., an increase of temperature of 42° C. is required.

If the volume of the fuel and the ash is doubled, the temperature increase or decrease per cycle will be 37.5° C. and 21° C.

The storage of heat in the fuel and the ash can also be varied and at the same time the temperature of the gases used may be changed by varying the amount of gas in the down and up directions.

Thus, for example, if the generator $1$ is in operation and the temperature at the points where the upper branches of the conduits $3$ enter the generator is too high, the temperature may be lowered by increasing the thickness of the ash bed $1c$ and more heat is thus stored in the ash, and the gas arrives with a lower temperature at this point, and in the next up cycle and blow cycle more heat is taken from the ash bed. Should the temperature at the point where the conduit $4$ enters the generator $1$ be too high, more gases may be taken out via conduits $3$ and the temperature at the point where the conduit $4$ enters the generator may thus be lowered.

The same considerations apply to the regulation of the temperature outside the reaction zone $1a$ in the upper part of the generator, and this may be regulated by increasing or decreasing the thickness of the fuel bed and by taking out various amounts of the gases via the conduits $9$ and $6$.

The temperature of the gases entering or leaving the conduit $4$ may also be regulated by the injection of water and steam or gases.

The variation in the depth and temperature of the reaction zone is effected by changing the temperature and velocity of the air entering the reaction zone.

2. Manufacture of carburetted water gas

The water gas for the manufacture of the carburetted water gas is manufactured in the manner described in Example 1 above.

The calculation of the heat required for the cracking of the oil injected for carburetting the water gas may be made as follows:

The weight of oil which can be cracked or used for carburetting by utilising the sensible heat of the gases produced can be found by using a simplified formula which I have developed, based on results obtained in this method of cracking of gas oil and which takes into account (1) The sensible heat required to bring the gases obtained and leaving the cracking zone to the temperature of the cracking reaction, (2) The reaction heat which is the difference between the heat in the oil and hydrogen consumed in the cracking and the products leaving the reaction zone, and (3) The losses:

$$g \text{ kgs. oil} = \frac{S_1 - S_2}{(t \pm x)(0.0004t + 0.310)} \text{ wherein}$$

$S_1$ = Sensible heat of the gases entering the cracking zone;
$S_2$ = Sensible heat of the gases leaving the cracking zone at the temperature $t$;
$t$ = Temperature at which the cracking is accomplished;
$x$ = A factor which will vary according to the conditions of the cracking and the yield of the products obtained in the cracking and which may be calculated using the following formula:

$$x = \frac{\text{Reaction heat} + \text{losses}}{0.0004t + 0.310}$$

Or if the oil is pre-heated and the pre-heat temperature is $t_1$ the formula is:

$$g \text{ kgs. oil} = \frac{S_1 - S_2}{(t \pm x)(0.0004t + 0.310) - t_1(0.0004t_1 + 0.319)}$$

If a regenerator is used for water gas production from tar or the like there must be taken into account the fact that the reaction heat of the water gas production is negative and must be provided by the heat stored in the checker bricks or by the combustion of oxygen and part of the fuel used. The hydrogen content of the fuel must also be taken into account as the hydrogen does not require reaction heat and steam. As the calorific value of the gas obtained may be considerably varied by the amount of steam or carbon dioxide used, it is necessary for the dimensions of the conduits to be sufficiently large to have the required flexibility.

Part of the gases may be removed at different points and in several streams from the regenerator, and to obtain gases with different calorific values and different compositions conduits should be provided for this purpose.

The composition of the gases taken out at these conduits may be regulated, in addition to the above-mentioned ways, by the variation of the temperature of the reaction and the points of the regenerator at which the gases are bled off.

3. *Production of synthesis gas and synthesis products from coal and residual gas (see Fig. 13 of the drawings)*

A coal which after carbonisation gives 800 kgms. of coke, 330 cubic metres of gas and 25 kgms. of tar per 1000 kgms. is introduced into a generator. 405 kgms. of coal are used per cycle and consequently the amount of coke gasified in the reaction zone per cycle amounts to 324 kgms. The water gas has the following composition: $CO = 42.0\%$, $H_2 = 52.5\%$, $CH_4 = 1.0\%$, $CO_2 = 2.5\%$ and $N_2 = 2.0\%$. The amount of coke required to produce a cubic metre of this water gas can be calculated as follows:

*Down gas making cycle.*—The gases leaving the reaction zone consist of 525 cubic metres of water gas and 52.5 kgms. of steam, and the sensible heat of the gases leaving the reaction zone at a temperature of 1100° C. is $525 \times 1100 \times 0.33 + 525 \times 1100 \times 0.517 = 221{,}000$ Cals. The sensible heat in the 300 cubic metres of water gas and 30 kgms. of steam leaving the generator through conduits 3 at 500° C. is $300 \times 500 \times 0.317 + 30 \times 500 \times 0.47 = 55{,}000$ Cals.

The sensible heat in the 225 cubic metres of water gas and 22.5 kgms. of steam leaving the generator through conduit 4 at 200° C. is $225 \times 200 \times 0.312 + 22.5 \times 200 \times 0.450 = 16{,}000$ Cals., so that the total heat removed with the gases from the generator is 71,000 Cals.

The heat stored in the ash bed is 150,000 Cals. The sensible heat of 235 kgms. of steam entering the generator from the regenerator at 650° C. is $235 \times 650 \times 0.485 = 74{,}000$ Cals. The sensible heat removed from the regenerator with the steam is $235 \times 650 \times 0.485 - 235 \times 120 \times 0.44 = 61{,}000$ Cals.

The sensible heat in the steam entering the reaction zone of the generator at 1000° C. is $235 \times 1000 \times 0.510 = 120{,}000$ Cals.

The heat removed from the fuel bed by the steam is $120{,}000 - 74{,}000 = 46{,}000$ Cals.

*Up gas making cycle.*—The gas leaving the reaction zone in the up gas making cycle consists of 225 cubic metres of water gas and 22.5 kgms. of steam. The sensible heat of the gases leaving the reaction zone at 1100° C. is: $225 \times 1100 \times 0.33 + 22.5 \times 1100 \times 0.517 = 95{,}000$ Cals. The sensible heat of the gases leaving the generator at 500° C. is $225 \times 500 \times 0.317 + 22.5 \times 500 \times 0.470 = 41{,}000$ Cals.

The heat transmitted to the fuel bed by the gases leaving the generator in the up gas making cycle is $95{,}000 - 41{,}000 = 54{,}000$ Cals.

The heat removed from the ash bed by the steam entering the reaction zone at 1050° C. is $100 = 1050 \times 0.513 - 100 \times 120 \times 0.447 = 49{,}000$ Cals.

0.432 kgm. of coke were used for the production of one cubic metre of gas and the coke directly converted into water gas was 0.280 kgm. per cubic metre of gas. 0.150 kgm. of coke is used in the blow period per cubic metre of gas produced and consequently the heat brought into the reaction zone in the gas making period and blow cycle at a temperature of 1050° C. will be $0.280 \times 1050 \times 0.37 \times 50 + 0.152 \times 1050 \times 0.37 \times 50 = 125{,}000$ Cals.

The blow gases leave the generator at 400° C. and the heat stored by the blow gases in the fuel bed is $610 \times 1100 \times 0.37 - 610 \times 470 \times 0.32 = 171{,}000$ Cals.

The heat required to be stored in the reaction zone per cycle without taking into account the heat introduced by the coke and steam but taking into account the heat of formation of the water gas, i. e. 460 Cals. per cubic metre, is $221{,}000 + 95{,}000 + 750 \times 460 = 661{,}000$ Cals. per cycle.

The heat required to be stored in the reaction zone taking into account the heat introduced with the steam and coke in the gas making cycle is $661{,}000 - (120{,}000 + 54{,}000 + 81{,}000) = 406{,}000$ Cals., or 541 Cals. per cubic metre of water gas produced.

The heat required to be introduced with the blow gases taking into account the heat introduced by the air and coke used in the blow cycle is $406{,}000 - [44{,}000 + (150{,}000 - 49{,}000)] = 256{,}000$ Cals.

The amount of blow gases required per cycle can be calculated as described above in Example 1 in connection with the production of blue water gas, and amount to 610 cubic metres. The amount of air required per cycle is $610 \times 0.96 = 585$ cubic metres. The air is pre-heated in the ash bed to 540° C. The coke required per cubic metre of gas, taking into account a loss of 7.0% is 1.07×0.403=0.43 kgm. per cubic metre.

Using 405 kgms. of coal per cycle from which is obtained 750 cubic metres of water gas of the composition referred to above, there are obtained 133 cubic metres of carbonisation gases which after decomposition in the regenerator give 240 cubic metres of gas having the following composition: CO=27.0%, $H_2$=70.0%, $CH_4$=1.0% and $CO_2+N_2$=2.0%, together with 10.1 kgms. of tar, from which after decomposition 40 cubic metres are obtained having the following composition: CO=40.0%, $H_2$=57.0%, $CH_4$=1.0% and $CO_2+N_2$=2.0%.

Thus, from the 405 kgms. of coal, 1060 cubic metres of gas are obtained having the following composition: CO=38.0%, $H_2$=57.5%, $CH_4$=1.0% and $CO_2+N_2$=3.5%.

This gas can be used as such for the Fischer-Tropsch or similar synthesis (for instance for production of olefine-rich products) or after adjusting the ration of $CO:H_2$ to 1:2, a gas of the following composition is obtained: CO=32.0%, $H_2$=63.5%, $CH_4$=1.0% and $CO_2+N_2$=3.5%.

Assuming a contraction of 60% in the synthesis oven and a yield of 106 gms. of liquid and hydrocarbon gases containing three and four carbon atoms in the molecule per cubic metre of synthesis gas, the composition of the residual gas will be: CO=30.0%, $H_2$=51.0%, $CH_4$=10.0% and $CO_2+N_2$=9.0%. From this gas decomposed in the regenerators (as shown and described in Fig. 14) 1.27 cubic metres of decomposed gas can be obtained per cubic metre of residual gas, having the following composition: CO=30.7%, $H_2$=61.5%, $CH_4$=0.8% and $CO_2+N_2$=7.0%. A part of this residual gas is mixed with the water gas and a part is taken out and treated separately so as not unduly to enrich the synthesis with carbon dioxide, nitrogen and the like.

The total amount of water gas and decomposed residual gas is 1520 cubic metres per cycle, and after being subjected to the synthesis process a contraction of 60% is obtained, so that 608 cubic metres of residual gas are obtained which after decomposition give 770 cubic metres of gas, of which 460 cubic metres are mixed with 1060 metres of water gas and 310 cubic metres are treated separately, the amount of synthesis products obtained being 194 kgms. per 405 kgms. of coal, so that the amount of coal required per kgm. of synthesis products is 2.08 kgms.

For the heat required in the regenerators and, if desired, for steam generation, the following sources are available:

(1) The sensible heat in the blow gases leaving the regenerators having an average temperature of 400° C.;

(2) The chemical or potential heat in the blow gases containing 8% of carbon monoxide;

(3) The heat in the residual gases which are obtainable from the synthesis gas which is treated separately;

(4) The sensible heat of the decomposed gases leaving the regenerator, which can be used if required, in heat exchangers or boilers to preheat the gases or steam required for the processes or to generate steam.

It has been found that these amounts are sufficient for the operation of the apparatus and it has further been found that by using this apparatus and using a coal having a calorific value of 7600 Cals. per kgm., 63.0% of the calorific value of the coal is converted into hydrocarbon liquids and hydrocarbon gases containing three and four carbon atoms in the molecule, and the output or the capacity of the apparatus is very high.

Other fuels such as coke, anthracite, lignite or peat may be used advantageously, and gases of other compositions, such as those containing a ratio of $CO:H_2$ of between 1:1 and 2:1 (using carbon dioxide instead of steam) may be advantageously produced.

Even if the yield per cubic metre is lower practically the same results are obtainable but the dimensions of the plant and the conduits must be chosen accordingly, and the above method of calculation assists in designing the plant.

The average inert content and composition of the synthesis gases is 6% of carbon dioxide plus nitrogen, and the composition of the synthesis gas is: CO=31.0%, $H_2$=62.0%, $CH_4$=1.0% and $CO_2+N_2$=6.0%.

The composition of the gas treated separately is: CO=30.7%, $H_2$=61.5%, $CH_4$=0.8% and $CO_2+N_2$=7.0%.

In all the embodiments described above the blow cycle may be carried out in the up and down directions, if desired.

The operation of "purging" may be introduced where required in any of the embodiments referred to above.

I claim:

1. An intermittent process for the manufacture of water gas in a generator operated to produce an ash bed resting on a grate in the bottom thereof, a reaction zone above the ash bed, formed by blasting the fuel to incandescence, and a fuel bed above the reaction zone, comprising the steps of blasting fuel in said reaction zone to incandescence by means of a blast of air passing in an up direction successively through said grate and said ash bed hot from a previous operation, passing the hot blast gases leaving the top of said reaction zone to a regenerator to heat the same, then initiating the gas making cycle by passing steam through the heated regenerator and thence downwardly through the reaction zone to produce water gas, passing the water gas from said reaction zone downwardly into the ash bed and removing said water gas through an outlet in the generator wall which is located at a fixed point above the grate, regulating the depth of the ash bed between the point of withdrawal of the water gas and the bottom of the reaction zone so as to store therein a large part of the sensible heat of the water gas passing therethrough, and utilizing the thus extracted heat from the water gas made in said gas making down run to preheat gases led to said generator through said ash bed in a succeeding up run.

2. A process according to claim 1 wherein a part of the water gas and undecomposed steam passing downwardly into the ash zone is removed through said fixed gas outlet and the remainder from below the grate and regulating the proportions of water gas removed from above and below the grate so as to prevent the temperature of the ash bed just above the grate from rising above 450° F.

3. An intermittent process for the manufacture of carburetted water gas in a generator operated to produce an ash bed resting on a grate in the bottom thereof, a reaction zone above the ash bed, formed by blasting the fuel to incandescence, and a fuel bed above the reaction zone, comprising the steps of blasting fuel in said reaction zone to incandescence by means of a blast of air passing in an up direction successively through said grate and said ash bed hot from a previous operation, passing the hot blast gases leaving the top of said reaction zone to a regenerator to heat the same, then initiating the gas making cycle by passing steam through the heated regenerator and thence downwardly through the reaction zone to produce water gas, passing the water gas from said reaction zone downwardly into the ash bed and removing said water gas through an outlet in the generator wall which is located at a fixed point above the grate, regulating the depth of the ash bed between the point of withdrawal of the water gas and the bottom of the reaction zone so as to store therein a part of the sensible heat of the water gas passing therethrough, utilizing the thus extracted heat from the water gas made in said gas making down run to preheat gases led to said generator through said ash bed in a succeeding up run, and injecting a hydrocarbon into the so produced water gas after it leaves the generator to carburet said water gas.

MICHAEL STEINSCHLAEGER.

REFERENCES CITED

The following references are of record in the file of this patent:

UNITED STATES PATENTS

| Number | Name | Date |
|---|---|---|
| 858,589 | Eyermann | July 2, 1907 |
| 1,085,806 | Evans | Feb. 3, 1914 |
| 1,573,524 | Rose | Feb. 16, 1926 |
| 1,752,036 | Steere | Mar. 25, 1930 |

FOREIGN PATENTS

| Number | Country | Date |
|---|---|---|
| 36,715 | Switzerland | Apr. 3, 1906 |
| 328,642 | Great Britain | Apr. 25, 1930 |
| 345,411 | Great Britain | Mar. 26, 1931 |